(No Model.)

S. COCHRANE.
VETERINARY SURGICAL INSTRUMENT.

No. 319,454. Patented June 9, 1885.

Witnesses.
A. Ruppert
J. P. Simpson

Inventor.
Sam'l Cochrane

UNITED STATES PATENT OFFICE.

SAMUEL COCHRANE, OF ARLINGTON, VIRGINIA.

VETERINARY SURGICAL INSTRUMENT.

SPECIFICATION forming part of Letters Patent No. 319,454, dated June 9, 1885.

Application filed November 19, 1884. (No model.)

*To all whom it may concern:*

Be it known that I, SAMUEL COCHRANE, of Arlington, in the county of Alexandria and State of Virginia, have invented a Device for Withdrawing Vegetables and Fruits Lodged in the Throats of Animals, of which the following is a specification.

The special object of the invention is to withdraw, without injury to the animal, a vegetable or fruit which may have become lodged in his throat below the muscles with which he swallows. Heretofore a straight piece of wood or other substance has been employed to push the obstruction down the animal's throat; but in some cases it destroys life, while it is attended with risk and more or less injury in all cases. The fruit or vegetable has slipped past the muscles of deglutition in a nearly or quite entire state, so that it is not in a proper condition to be forced down into the stomach, but should be brought back into the mouth for mastication and comminution. This is promptly and completely effected by my invention, which will be first described in connection with the drawings, and then clearly pointed out in the claim.

Figure 1:
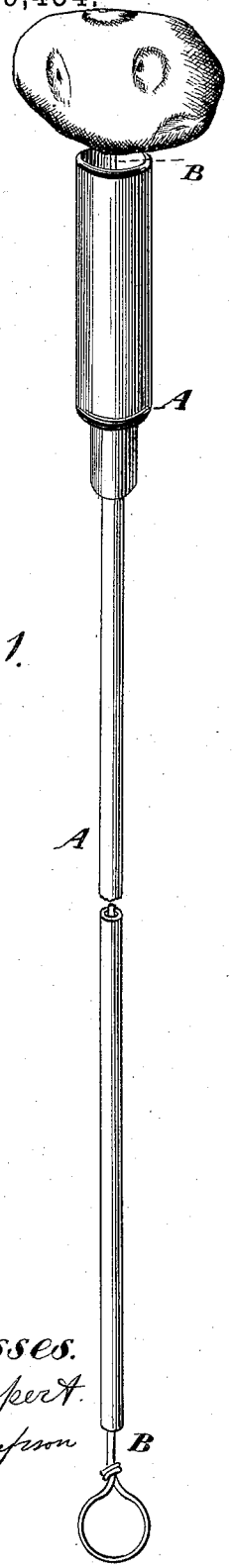
Figure 2:

In the drawings, Figure 1 represents a plan, and Fig. 2 a sectional view.

A represents a tube, which is preferably enlarged at the front end, and is open at both ends. B is the instrument, which is intended to become fastened in the vegetable or fruit, and is so arranged on the inside of tube as to bring the spiral screw on its front end within the front enlargement of the tube, wherein it may be moved back and forth by its stem. The latter has its rear end extending out of and beyond the end of the tube, so that the loop, ring, or other handle on its end may be readily seized between the fingers and turned around, while it is slightly pressed forward. Near the front end of the instrument I may use a stop to gage the extent of the forward movement of the instrument, or I may dispense with it entirely.

The instrument may readily be contained within a hollow cane having a cap on each end, so that it may be constantly in the farmer's hand, and always ready for immediate use.

In actual use the animal's head is brought as nearly as possible in a straight line with his throat, and the tube thrust gently into the throat until its front end comes in contact and bears against the apple or potato which is lodged. Then the stem of the instrument B is given one or more turns until the spiral screw has taken a firm hold on the obstruction. It is then pulled back with the tube A, bringing out the vegetable or fruit. In this way I avoid all possibility of injuring the animal, do not push the obstruction down, but draw it backwardly out, and bring complete relief in a few moments.

I am aware that an arrow-head has been used with the special object of forcing the obstruction down the throat of a choked animal, and, if this fails, to embed itself sufficiently to bring it up; but my special object is to prevent the obstruction from going down, and to compel it to come up. An arrow-head pusher requires a considerable force to make it pierce a potato or analogous substance, amply sufficient, ordinarily, to push the entirety down the throat of the animal—a result greatly to be deplored.

Cattle and sheep have a false stomach, into which comminuted food is first deposited and rolled up into the cud form. It is then disgorged and properly masticated, when it is transmitted to the stomach proper in order that it may be digested. The animal cannot disgorge an apple or potato, or bring it into the cud form, without the greatest difficulty, if at all, and hence is sick and pining for a long time.

It will also be observed that an arrow-head makes a straight opening, cuts all the fibers as it passes along, and by its wedge form condenses them on each side thereof. The fibers have but little elasticity at best, and this little is completely destroyed by the cutting; hence when the arrow-head has failed to thrust a potato down the animal's throat there is but little probability that it can bring it up. On the other hand, my spiral, with its sharp point, rotates gently among and through the fibers without cutting them, and gets such a firm and sure hold that the obstruction is easily withdrawn.

What I consider to be new, and desire to protect by Letters Patent, is—

A sharp-pointed spiral or corkscrew, combined slidingly and rotatingly with a surrounding tube, the latter adapted to be moved up against a potato or analogous substance in the throat of an animal, and the former to rotate until it takes a sufficient hold, as and for the purpose specified.

SAMUEL COCHRANE.

Witnesses:
JESSE MIDDLETON,
SOLON C. KEMON.